United States Patent Office.

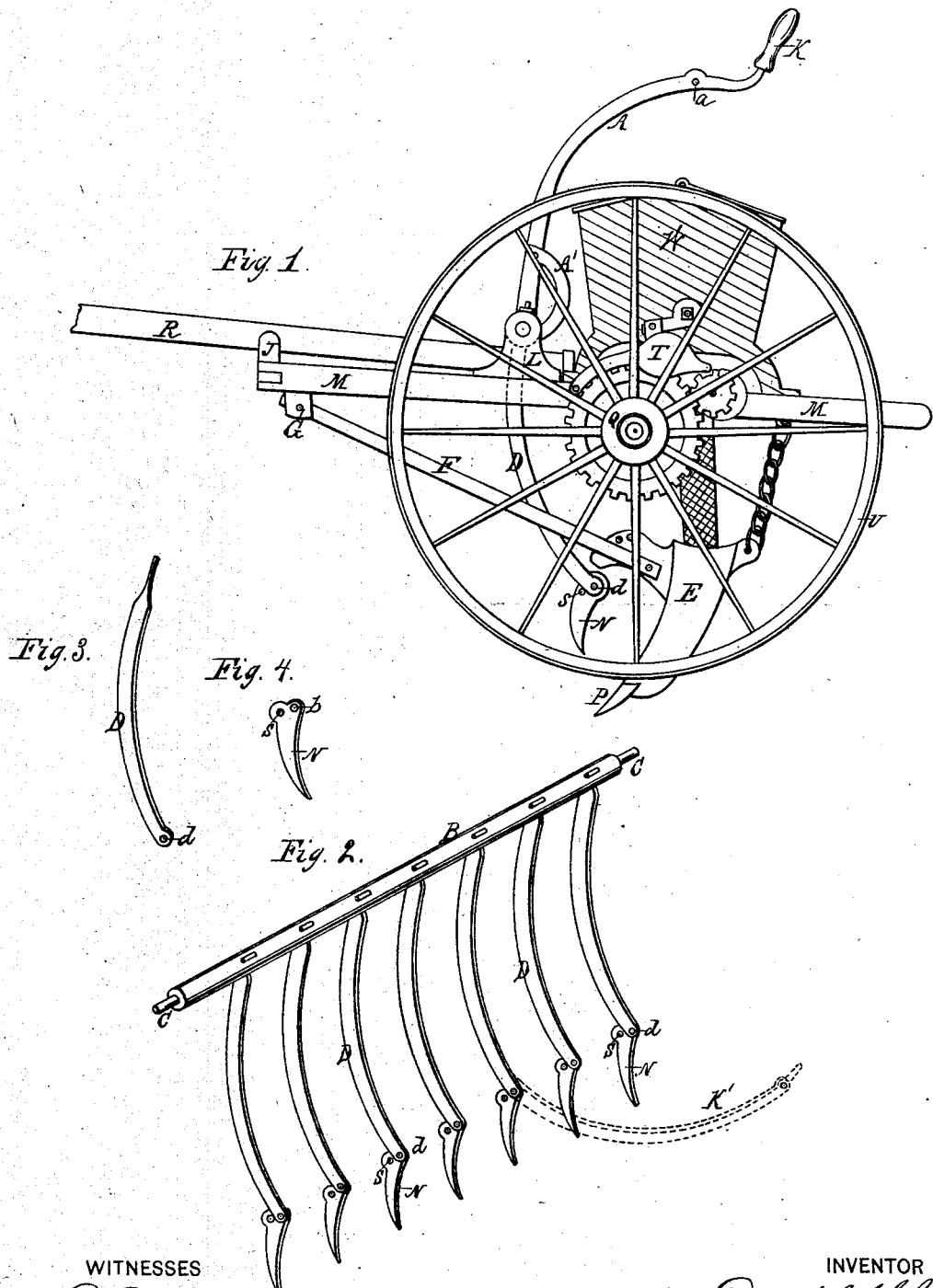

DANIEL J. SHULTS, OF SPRUCE CREEK, PENNSYLVANIA.

GRAIN-DRILL CLEANER.

SPECIFICATION forming part of Letters Patent No. 236,963, dated January 25, 1881.

Application filed September 8, 1880. (No model.)

*To all whom it may concern:*

Be it known that I, DANIEL J. SHULTS, of Spruce Creek, county of Huntingdon, Pennsylvania, have invented a new and useful Grain-Drill Cleaner, of which the following is a specification.

My invention relates to improvements adapted to all the grain-drills in common use, on any of which my apparatus may be mounted; and its object is to provide a means to remove the obstructing trash, such as cornstalks, stubbles, weeds, unseasoned manure, &c., away from the shovels, and to pass it by a forced delivery rearward free of them.

The principal features of my improvement are, first, an oscillatory hand apparatus, consisting of a head or beam shaft, into which tines are fixed and depend down between the drills or drag-bars thereof, the lower end of the tines being provided with pendulous flukes pivoted loosely thereto, and stopped to be deflected rearward only sufficiently to set the flukes vertically when acting on trash to be removed, but capable of being deflected freely in the forward direction to disengage them of trash in returning to position after raking it, the same being mounted, by means of chairs, on the carriers of the drill-carriage, and, by rearward sweeping motion when operated by hand, raking the spaces between the drills; second, the connected hand apparatus composed of the parts above enumerated, and arranged transversely on the drill-carriage, in front of the seed-trough thereon, in combination with an operating handle or lever, accessibly arranged to be reached by the operator while walking after the drill. I attain these objects by the mechanism illustrated in the accompanying drawings, in which—

Figure 1 represents a side elevation of the principal parts of a grain-drill with my improvement mounted thereon. Fig. 2 is a perspective view of my apparatus detached. Fig. 3 represents one of my tines. Fig. 4 represents one of my flukes.

Similar letters refer to similar parts throughout the several views.

The part represented by B is a rock-shaft or beam, to which the tines D are fixedly attached by screws or clenches. Said shaft has the journals C C thereon, which enter bearings in the chairs L, mounted on the carriers M of the drill-carriage, in position as shown in Fig. 1, and it is located in front of and near the grain-trough W, and parallel with it. It is generally preferable to mount said shaft somewhat elevated above the drills E, to obtain greater radius or sweep for the parts attached to it. It is for this reason raised by said chairs to be above the tongue R. When, however, the drill-wheels V and carriage are built high, said shaft may be located directly beneath said tongue, its ends being journaled in blocks arranged on the inner sides of the carriers M.

The tines D are made in form, and inserted into the shaft B as a head, in position substantially as shown in Fig. 2. They are attached either by screws and nuts or by clenches, and somewhat resemble iron rake-teeth in a head. The tines are usually made of flat bar-iron, with the edge presented toward the drills for greater strength, and they are extended to about the mid-height of the drill-shoes E, and bent to terminate about one foot in front of the same, and they are spaced from each other properly to swing midway between said shoes. The lower end of each tine has an eye formed thereon, through which a rivet, $d$, loosely connects the fluke N to let it hang pendulous. Said rivet is rigidly secured to the fluke-head and moves freely as a journal in said eye as a bearing in the tine, the rivet-head serving to keep the parts applied against each other. A lug or stop, $s$, is formed on said fluke-head, as shown, which, by setting against the body of the tine, limits the deflection of the fluke at a point when its body is nearly in the vertical direction, as shown in Fig. 2. Said fluke is thus stopped that, when the tine is thrust between the drill-shoes, it may be in right position, as a spur, to properly seize the obstructing trash gathered in front of the shovels P, and pass it rearward, where it is deposited free of them when the apparatus is rocked back to its place of rest. That such transferred trash may surely be deposited, as stated, said flukes are made deflectable in the opposite direction to drag back idly, or disengaged at the return of the apparatus to its position of rest. The fluke-body is made tapering to a point, and is curved claw form, that it may hold the trash without slipping onto the tine, and that it may readily relieve itself in the opposite direction.

It may be observed that the center of the oscillatory motion of my apparatus is so located in relation to the drills that the trash lodged on the shovels may be caught and moved by the flukes with a peculiar lifting rearward sweep, so as to dislodge it from its perch with the least resistance. For a similar reason the points of the flukes are made to describe arcs a little above the level of the ground to be unobstructed by clods.

The apparatus, it will be noticed, when hanging at rest over the center of gravity, is out of the way of all parts of the drill.

I sometimes modify the parts as follows:

First, the actuating-lever A is supplemented by bolting to it, at a point, $a$, an added handle, which, in some makes of drills, can be easier reached by the attendant while walking at the rear, the handle K being then used only when the attendant is seated on the drill.

Second, when the tines are made of annealed cast-iron, their lower ends are made with sockets to fit the flukes, and in which they are pivoted to be stopped in right position, thus omitting the pin or lug $s$. The latter may be formed on the tine, as herein shown, upon the fluke, the one plan being the converse of the other, and the parts in both being made to conform to each other.

Third, a couple of the tines D may be continued rearward beyond the fluke articulations, and the ends, by being suitably curved and joined, will then constitute a handle by which the attendant may hold to operate the apparatus while walking. The lever A may then be omitted.

Having adequately described my apparatus, what I desire to secure by Letters Patent is substantially as follows:

1. The oscillatory hand apparatus consisting of the head or shaft B, the tines D, inserted in said head and provided with the pendulous flukes N, pivoted thereto and stopped, as set forth, in combination with the chairs L on parts M, or their equivalents, on the grain-drill carriage, said tines armed with said flukes being arranged to rake the spaces between the drills E P, when operated by rearward sweeping motion, substantially as and for the purpose set forth.

2. The connected manual drill-cleaner composed of head or shaft B, tines D, flukes N, and operating-lever, the same being mounted transversely on the drill-carriage in front of the seed-trough W, having the ends of shaft B journaled in chairs L, and having said flukes sweep free of the ground, substantially as and for the purpose set forth.

In testimony that I claim the foregoing as my invention I have hereunto set my hand, in presence of two witnesses, this 9th day of July, A. D. 1880.

DANIEL J. SHULTS.

Witnesses:
THEOPHILUS WEAVER,
PETER STUCKER.